Patented Nov. 6, 1951

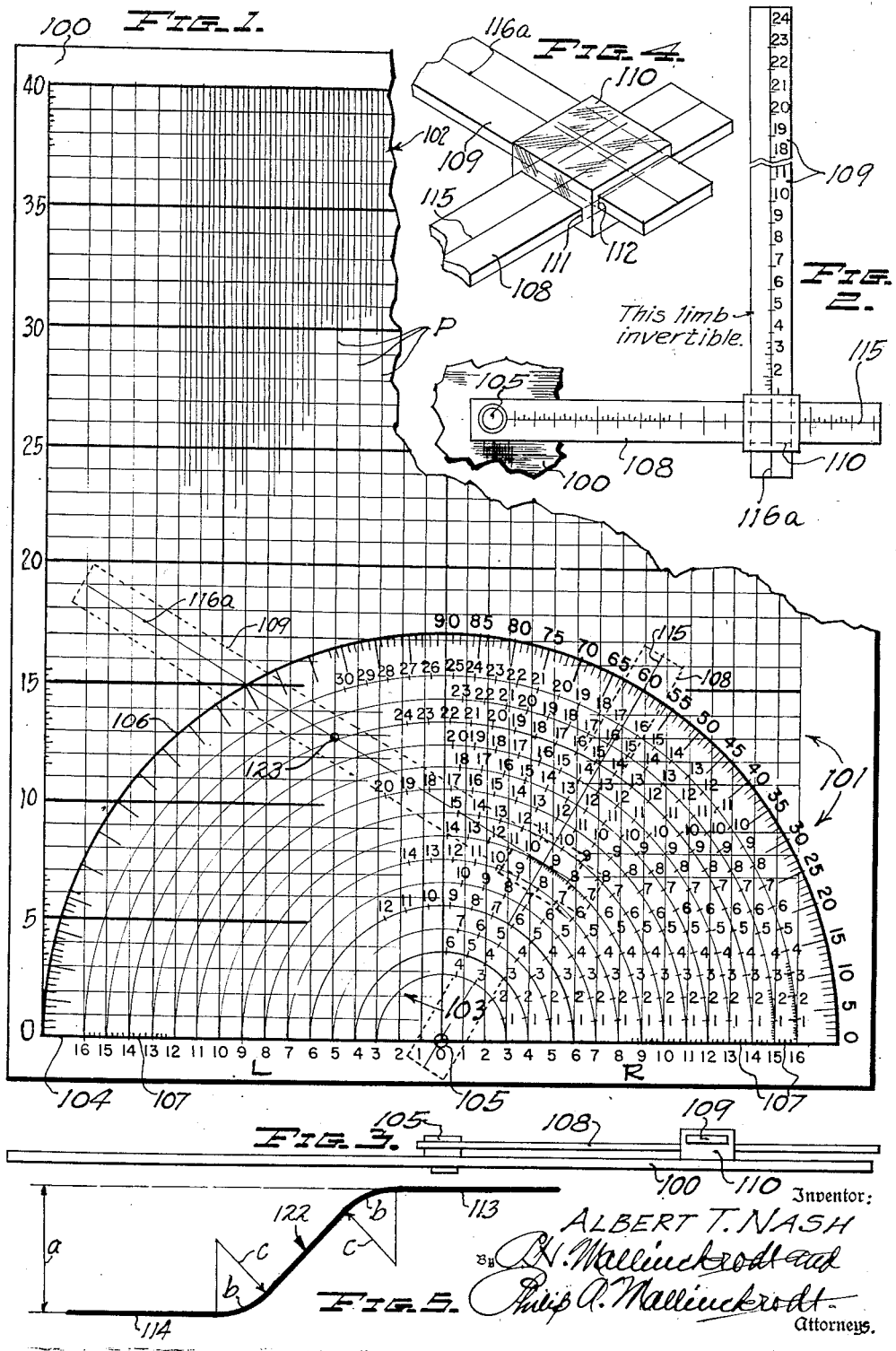

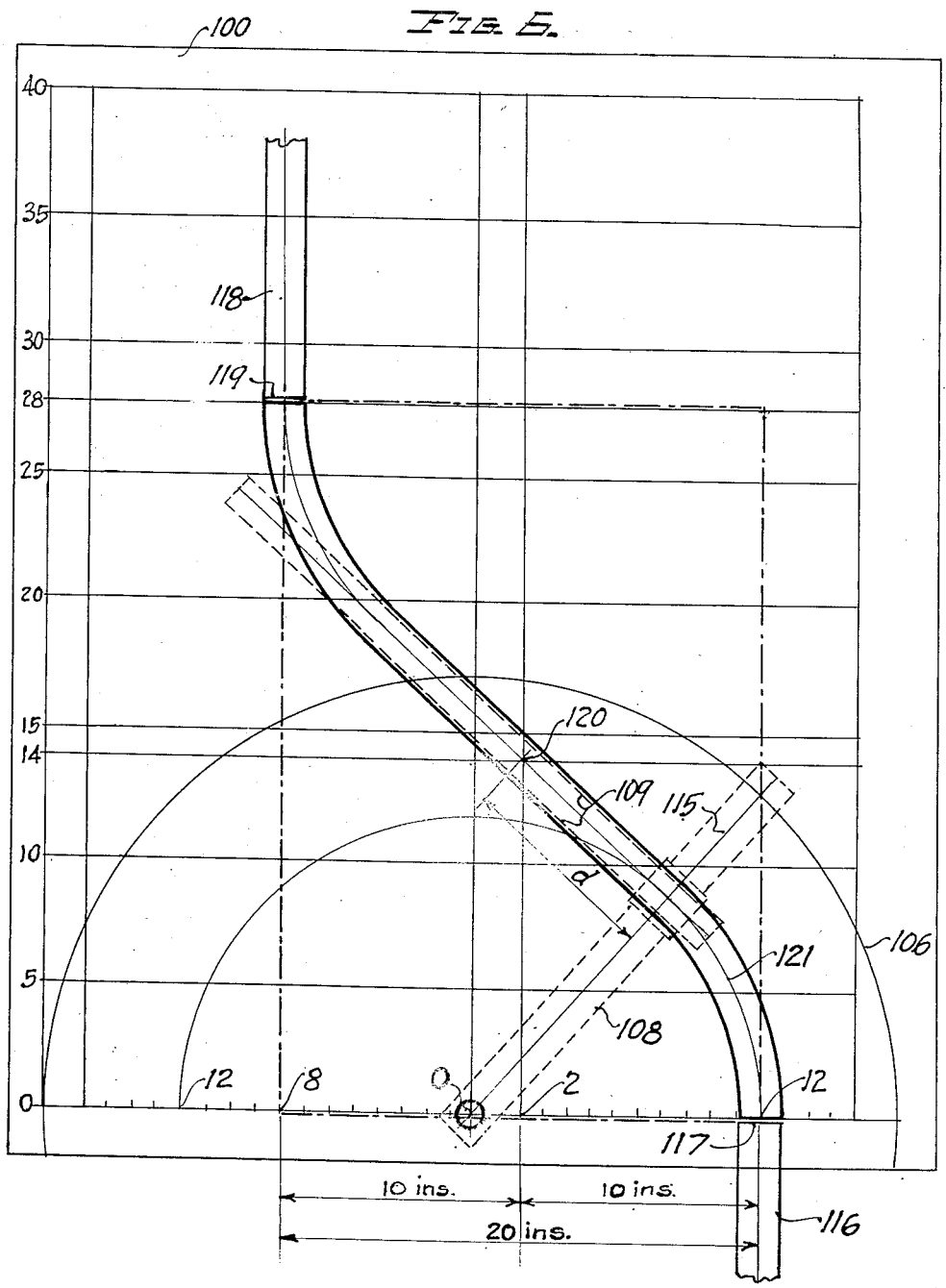

2,573,803

UNITED STATES PATENT OFFICE 2,573,803

INSTRUMENT FOR COMPUTING ARCUATE LENGTHS AND LENGTHS HAVING ARCUATE COMPONENTS

Albert T. Nash, Salt Lake City, Utah

Application December 30, 1947, Serial No. 794,548

2 Claims. (Cl. 235—61)

The instrument is particularly adapted for ascertaining the lengths along curved lines of pipes, conduits and other structural items.

The principal objects of the invention are:

To save time in executing pipe and conduit or other offset calculations; to find lengths of arcs quickly by even unschooled labor and to solve related problems mechanically.

The utility of the instrument of the invention is particularly manifest in the plumbing, steam fitting and electric wiring trades although not necessarily restricted thereto.

In plumbing and steam fitting operations it is a constant requirement to ascertain the lengths to which pipes must be cut before bending the same to fit certain required curves. In electric wiring the same is true of the conduits in which the wiring is encased.

According to the invention, a diagram is provided which includes a plurality of spaced apart concentric arcs, these, advantageously, being semicircles springing in common from a straight base line representing diameters. At least one of the arcs, preferably the outermost one, is graduated in circular measure, that is to say, in degrees and fractional parts thereof. The semicircles have graduations that represent cumulative, progressive lengths in any desired units such as inches, the accumulated lengths being marked at the respective graduation and referred to the aforesaid line of diameters. A primary limb is disposed to turn about the common center and is thereby operative to radially intersect the various arcs. The points of intersection along the respective arcs in units and fractions indicate lengths. A secondary limb extends transversely of the primary limb and by means of a mutually engaging slider is universally movable in the common plane of the two limbs.

On the diagram, and preferably perpendicular to the base line, is a plurality of parallel lines that rise from the respective radial divisions on the base line and indicate terminal points of tangents to corresponding arcs.

By centering the primary limb along the base line, setting the secondary limb at the point of the desired radius, and then rotating the limb assembly to the desired angle, the length of the item to be cut is read directly. The length of the arcuate portion of the item is read along an arc, while the tangent, should such be included, is read along the scale on the secondary limb.

In the accompanying drawing, which illustrates one embodiment of the invention,

Fig. 1 represents a plan of the chart board, a portion being broken away for convenience;

Fig. 2, a plan of the limb assembly alone;

Fig. 3, a front elevation of the chart board and the limb assembly in combination therewith;

Fig. 4, a fragmentary view in enlarged perspective of a portion of the limb assembly;

Fig. 5, a diagram showing an example of work that is facilitated by employing the device of the invention; and, Fig. 6, another diagram showing a different approach to the solution of a problem common in practice.

Referring to the drawing, the numeral 100 denotes a board of any suitable dimensions. On the face of this board is represented, by means of printing or otherwise, a chart or field 101. Suitably delineated in this field are a plurality 102 of spaced parallel perpendicular lines, a plurality of spaced transverse lines, and a plurality 103 of spaced semicircles. As shown, the spaced parallel lines and the spaced semicircle spring from a base line 104 that at the same time represents diameters of the semicircles.

Commencing at the common point of reference 105 as zero, the semicircles are spaced apart a unit distance, such as one inch, the points at which the semicircles meet the base line being consecutively numbered, preferably to the left of the zero point in the space L, and to the right in the space R. The principal individual perpendiculars P of the group 102, are erected at the meeting points. The said letters L and R may also be used to designate the respective quadrants of the semicircular area.

Lengths of arc in units, such as inches, are laid off on the respective arcs commencing at the base line, while one of the semicircles, preferably the outer one designated 106, is laid off in units of circular measure, such as degrees, commencing preferably at the base line, for illustration, as shown along the quadrant R.

As shown, each of the main divisions contains five degrees. For extreme precision the degrees may be further subdivided in the usual manner.

Obviously the units of length may be subdivided as usual into sixteenths, eighths or quarters, the latter being indicated, for example, at 107.

The limb assembly comprises the primary limb 108 centered at zero, and the secondary limb 109, the two limbs being universally slidable relatively to each other in the common plane thereof, by means of a slider 110. The slider is preferably made of transparent material such as a suitable plastic, and is provided with the slots 111 and 112 in which each of the respective limbs 108 and 109 is longitudinally movable transversely of the other. The primary limb may be graduated to correspond to the scale along the base line 104, while the secondary limb 109 has on it a scale of unit lengths, in this instance, from one inch to twenty-four inches.

The manner of using the instrument will now be described in connection with Fig. 5. Here, two runs of pipe 113 and 114 are to be connected together by means of a reversely curved portion generally called an "offset," the problem being to find the length of this portion so that the requisite length of pipe can be cut from a stock length. An offset generally forms a curve consisting of two arcs, or two arcs connected by a common tangent.

The first step is to measure the distance a between the two runs and to choose the radius c of each arcuate portion b. In this example the distance a is measured as 28 inches, the diameter of the pipe is assumed as 1½ inches which brings the radius c to 9 inches. The extent of the arc is assumed as 60 degrees. In bending pipe it is an accepted usage of the trade using pipe to make the radius of a bend not less than six times the diameter of the pipe concerned.

The problem just proposed, is solved by setting the secondary limb 116a at the desired radius, 9-inches, along the scale 115 on primary limb 108. Next the limb assembly intact is moved around the zero point until line 115 registers at 60-degrees on circular scale 106, as indicated in dotted lines in Fig. 1. The mid-point 122 of the desired offset is fourteen inches from each line 113 and 114. This distance, fourteen inches, is now read off to the left of the 9-inch division on base line 104 in quadrant "R," and therefore comes to the 5-inch division in quadrant "L." At this division the registering perpendicular is followed upward to the point (in this instance point 123) where the perpendicular intersects the scale 116a in the dotted position of the limb assembly. The reading from the zero point on scale 116a to the point 123 in Fig. 1 is the measure of one-half the tangent that connects the two arcs "b" to each other in Fig. 5. Obviously by adding the length of the tangent and the length of the two arcs "b" together, the length of the offset connecting the two lines 113 and 114 to each other, is obtained.

In the example just given, unit numbers have been used for convenience, but in actual practice fractional parts of unit divisions are of common occurrence.

In electrical work a common problem is to find the length of stock conduit that must be cut off to form the offset required to connect two existing conduits, the center to center distance, as well as the distance between the fixed ends being determined by measurement. It is convenient to consider the offset as being contained in a rectangle, one dimension of which being the said center to center distance, and the other dimension the end to end distance. In Fig. 6, one dimension is laid off on the base line 104, and the other, on the corresponding perpendicular linear scale at the left of the figure.

In Fig. 6, let 116 denote a 2-inch conduit ending at 117, and 118 another conduit ending at 119, these to be joined together by the offset. Assume the center to center distance of the conduits to be 20 inches, and the distance between ends 117 and 119 to be 28 inches. The radius of bends must be at least six times two or 12 inches.

Using a skeleton diagram of the chart 101, Fig. 1, the 12-inch radius is taken to the right of zero on base line 104 and the dimension 20 inches is read off from 12 on the base line to a point at the left of the 12-inch mark. This brings the other end of the 20-inch side to division 8 at the left of zero, and its center to division 2 at the right of zero. Taking one-half the other side of the rectangle, or 14 inches, measured along the perpendicular scale at the left of Fig. 6, and following from there, a line parallel to the base line, to its intersection with the aforesaid perpendicular at 2, the center of the rectangle is located at 120.

Now, the secondary limb of the limb assembly is set on the primary limb at the division corresponding to 12 on the base scale, and the limb assembly is revolved until the line 116 coincides with the center point 120. By reading off the distance d on the secondary limb and adding to it the length of the arc 121 of the semicircle at 12, and doubling the sum, the length of the desired offset is ascertained.

To skilled persons many other uses of the instrument in the graphical solution of mathematical problems will be obvious. For illustration, if either side of a right triangle is taken on the primary limb 108 in Fig. 1, and the other side on the secondary limb 109, then, because one end of the side taken on the primary limb is fixed at the pivotal point 105, and the free end of the side on the secondary limb can be brought into registry with scale L, the length of the hypotenuse may be read on that scale. The truth of the converse of this statement is self-evident. Thus, problems in constructional work, such as marking out rafters or stairs involving rise and run dimensions, can readily be solved.

It will be understood that the numerical or other indexing of the field and the limb assembly can be widely varied in accordance with specific requirements.

Irrespective of the fact that the specific details of construction are necessarily shown and described by way of illustration in the foregoing disclosure, the invention is limited only by the terms of the following claims.

Having fully described the invention, what is claimed is:

1. An instrument for computing arcuate lengths, comprising a board having a plurality of concentric spaced arcs represented thereon, a datum line intersecting said arcs radially, said arcs having indexed graduations representing units of length reckoned from said datum; and a swinging limb assembly consisting of a primary limb pivoted concentric with said spaced arcs and a secondary limb universally movable along, and transversely of, said primary limb in the common plane thereof.

2. A computing instrument comprising a graphical representation of a plurality of spaced, concentric semicircles having units of length reckoned from a base diameter thereof and marked along the respective semicircles; a representation of a concentric semicircle graduated in circular measure; and a limb revolvably disposed at the center of said semicircles so as to selectively determine radial lines passing through said circular graduations and to simultaneously intersect said spaced semicircles, thereby indicating lengths along the respective semicircles corresponding to any selective setting of said limb along said circularly graduated semicircle.

ALBERT T. NASH.

REFERENCES CITED

The following references are of record in the file of this patent:

UNITED STATES PATENTS

| Number | Name | Date |
|---|---|---|
| 378,257 | Leschorn | Feb. 21, 1888 |
| 462,234 | Brotherhood | Nov. 3, 1891 |
| 1,048,044 | Craig | Dec. 24, 1912 |
| 1,133,540 | Dannenberg | Mar. 30, 1915 |
| 1,466,416 | Whitaker | Aug. 28, 1923 |
| 2,463,789 | McGuckin | Mar. 8, 1949 |